United States Patent
Liverance et al.

(10) Patent No.: US 10,628,217 B1
(45) Date of Patent: Apr. 21, 2020

(54) TRANSFORMATION SPECIFICATION FORMAT FOR MULTIPLE EXECUTION ENGINES

(71) Applicant: Amazon Technologies, Inc., Seattle, WA (US)

(72) Inventors: Fletcher Liverance, Oakland, CA (US); Chance Ackley, Royal Oak, MI (US); Dominic Corona, Rochester Hills, MI (US)

(73) Assignee: Amazon Technologies, Inc., Seattle, WA (US)

( * ) Notice: Subject to any disclaimer, the term of this patent is extended or adjusted under 35 U.S.C. 154(b) by 128 days.

(21) Appl. No.: 15/717,587

(22) Filed: Sep. 27, 2017

(51) Int. Cl.
*G06F 9/48* (2006.01)
*G06F 9/50* (2006.01)
(Continued)

(52) U.S. Cl.
CPC .................. *G06F 9/50* (2013.01); *G06F 9/46* (2013.01); *G06F 9/48* (2013.01); *G06F 9/4806* (2013.01); *G06F 9/4868* (2013.01); *G06F 9/4881* (2013.01); *G06F 9/5005* (2013.01); *G06F 9/5033* (2013.01); *G06F 9/5044* (2013.01); *G06F 9/5055* (2013.01); *G06F 16/25* (2019.01); *G06F 16/254* (2019.01);
(Continued)

(58) Field of Classification Search
CPC ...... G06F 16/25; G06F 16/254; G06F 16/258; G06F 9/48; G06F 9/4806; G06F 9/4843; G06F 9/4868; G06F 9/4881; G06F 9/50; G06F 9/5005; G06F 9/5033; G06F 9/5044; G06F 9/5055
See application file for complete search history.

(56) References Cited

U.S. PATENT DOCUMENTS 8,744,994 B2 * 6/2014 Chen .................. G06F 16/8373
707/602
8,892,947 B1 11/2014 Chopra et al.
(Continued)

OTHER PUBLICATIONS

Google Cloud Platform, "Deploying a Pipeline," Google, Jul. 2017, Retrieved from: https://cloud.google.com/dataflow/service/dataflow-service-desc, pp. 1-11.

*Primary Examiner* — Charles M Swift
(74) *Attorney, Agent, or Firm* — Robert C. Kowert; Kowert, Hood, Munyon, Rankin & Goetzel, P.C.

(57) ABSTRACT

Methods, systems, and computer-readable media for a transformation specification format for multiple execution engines are disclosed. A transformation specification is expressed according to a transformation specification format. The transformation specification represents a polytree or graph linking one or more data producer nodes, one or more data transformation nodes, and one or more data consumer nodes. An execution engine is selected from among a plurality of available execution engines for execution of the transformation specification. The execution engine is used to acquire data from one or more data producers corresponding to the one or more data producer nodes, perform one or more transformations of the data corresponding to the one or more data transformation nodes, and output one or more results of the one or more transformations to one or more data consumers corresponding to the one or more data consumer nodes.

20 Claims, 7 Drawing Sheets

(51) Int. Cl.
*G06F 16/25* (2019.01)
*G06F 9/46* (2006.01)
*G06Q 10/08* (2012.01)
*G06F 16/951* (2019.01)

(52) U.S. Cl.
CPC .......... *G06F 16/258* (2019.01); *G06F 16/951* (2019.01); *G06Q 10/087* (2013.01)

(56) References Cited

U.S. PATENT DOCUMENTS

| | | | |
|---|---|---|---|
| 9,053,210 B2 | 6/2015 | Elnikety et al. | |
| 9,529,630 B1 | 12/2016 | Fakhouri et al. | |
| 9,665,463 B2 | 5/2017 | Anderson et al. | |
| 10,242,079 B2 * | 3/2019 | Kim | G06F 16/248 |
| 2002/0120915 A1 * | 8/2002 | Khan | G06F 9/4881 717/100 |
| 2013/0191404 A1 * | 7/2013 | Holmes | G06F 17/2247 707/755 |
| 2013/0332475 A1 * | 12/2013 | Michelstein | G06F 17/211 707/756 |
| 2014/0122533 A1 * | 5/2014 | Baldwin | G06F 17/279 707/792 |
| 2014/0172914 A1 * | 6/2014 | Elnikety | G06F 16/9024 707/774 |
| 2014/0181836 A1 * | 6/2014 | Tripp | G06F 8/433 718/106 |
| 2015/0316972 A1 * | 11/2015 | Chen | G06F 16/258 713/320 |
| 2015/0370869 A1 * | 12/2015 | Caruana | G06F 16/254 707/756 |
| 2015/0370870 A1 * | 12/2015 | Caruana | G06F 16/258 707/602 |
| 2017/0221240 A1 * | 8/2017 | Stetson | G06T 11/206 |
| 2018/0129719 A1 * | 5/2018 | Kim | G06F 16/258 |

* cited by examiner

TRANSFORMATION SPECIFICATION FORMAT FOR MULTIPLE EXECUTION ENGINES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed system may provide remote clients with access to various services that are implemented largely within the distributed system and that are accessible via a network such as the Internet. Examples of such systems include online merchants, internet service providers, corporate networks, cloud computing services, web-based hosting services, and so on. Complex systems may include many services that interact with one another in varied ways. For example, a distributed or cloud-based system may offer an execution engine for executing client-supplied logic. Typically the logic must be expressed in a format that is specific to the particular execution engine.

Figure 1:
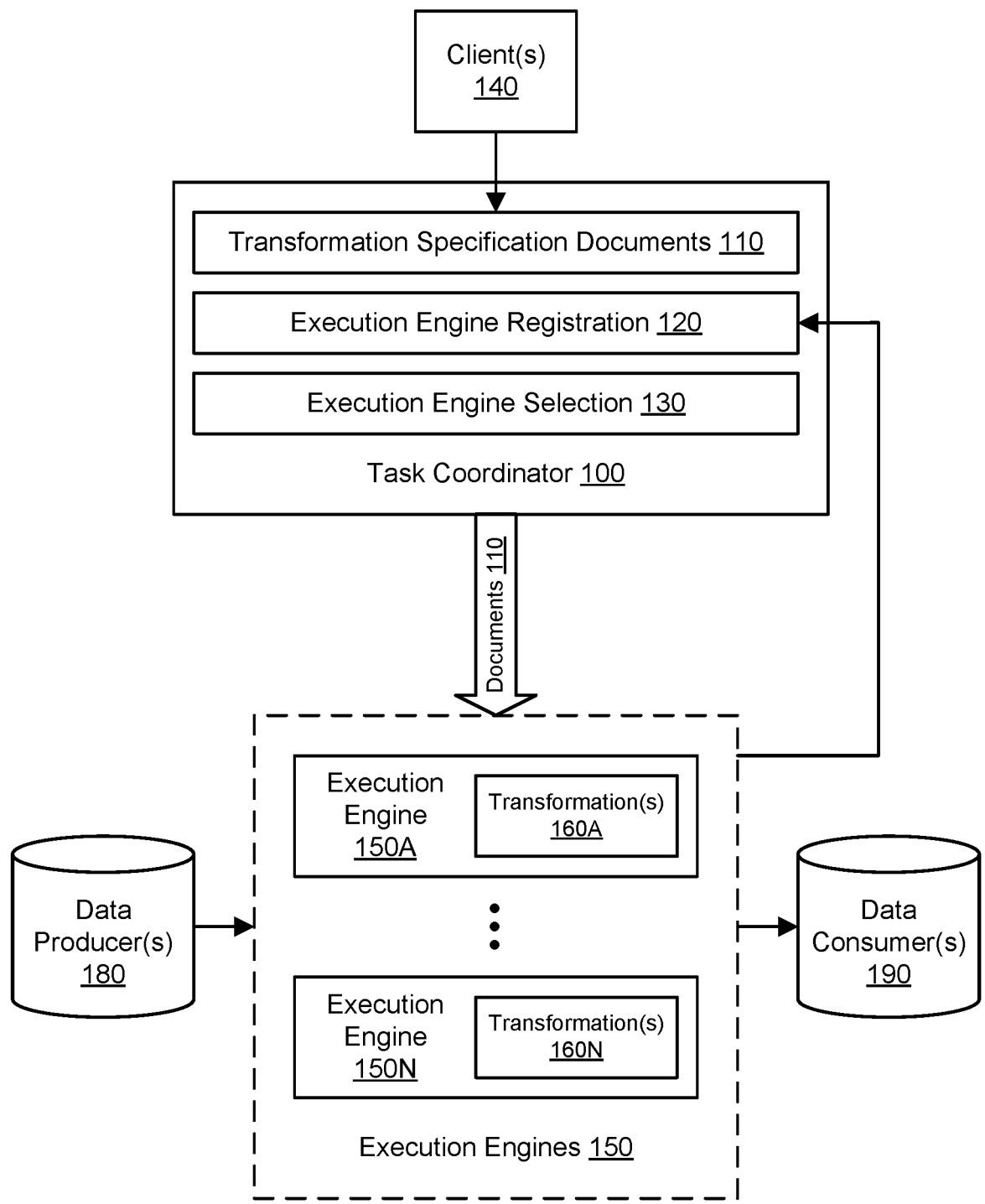
FIG. 1 illustrates an example system environment for a transformation specification format usable with multiple execution engines, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for a transformation specification format usable with multiple execution engines are described. In a distributed system or cloud computing environment, different execution engines may offer execution of tasks to clients. The execution engines may differ in their capabilities and configurations. The execution engines may be designed for different problem domains, such as batch processing, stream processing, call/response, and so on. Using the techniques described herein, a common format for specifying tasks may be used with different execution engines. The format may be referred to as a transformation specification format. In one embodiment, the format is independent of the execution engines and independent of the capabilities and configurations of the execution engines. A transformation specification document expressed according to the format may describe a polytree or other graph with data producer nodes, data transformation nodes, and data consumer nodes. The polytree may include multiple root nodes and/or multiple leaf nodes. A centralized coordinator may store such documents, select an execution engine for execution of a document, and provide the document to the selected execution engine. The execution engine may instantiate, provision, or otherwise manage computing resources for execution of one or more tasks according to the provided document. If the polytree includes multiple root nodes that represent data sources, then a tree walk technique may walk back up the tree to acquire additional input data if a transformation node is encountered that requires multiple inputs. By separating a generic transformation specification format from the details of the underlying engines, an execution engine may be modified without necessarily having to update the transformation specifications that run on that execution engine. Similarly, a transformation specification may be modified without necessarily having to update the execution engine that runs it. Using prior approaches, new services were often developed for each type of transformation. Using the common format described herein, new transformations may be implemented with much less developer effort than would be required to develop new services.

FIG. 1 illustrates an example system environment for a transformation specification format usable with multiple execution engines, according to one embodiment. A task coordinator 100, also referred to as a task coordination system, may orchestrate the execution of tasks based on transformation specification documents 110. The task coordinator 100 may represent a centralized system or service for managing transformation specification documents 110. The documents 110 may be provided by one or more clients 140. The documents 110 may specify transformations of data and may share a common transformation specification format. The documents 110 may be stored using persistent storage associated with the task coordinator 100, e.g., storage in or accessible to one or more computing devices that implement the coordinator. The task coordinator 100 may provide the documents 110 to a set of execution engines 150 for execution of tasks indicated in the documents. Although the capabilities and configurations of the execution engines 150 may differ, the same transformation specification format may be used for the transformation specification documents 110 that are executed using the different engines. The documents 110 (and the format they share) may be said to be independent of the execution engines 150, such that the documents are not necessarily tied to a format specific to any of the execution engines. The documents 110 may describe tasks to be performed in a high-level and/or generic manner, and the execution engines may implement the actual logic for executing such tasks. The documents 110 may include structured data but may not include compiled program code that is executed using the execution engines 150. The details of the task execution by the engines 150 may be unknown to the task coordinator 100.

Instead of using engine-specific formats to specify tasks such as data transformations, the same transformation specification format may be used to specify data transformations in a variety of problem domains and for a variety of underlying execution engines 150. In one embodiment, one of the documents 110 written according to the transformation specification format may specify a directed graph of rules by which attributes may be manipulated, and the rules may be executed on one of the execution engines 150. The transformation specification format may be said to be a common, shared, or unified format. The transformation specification format may be used for a variety of use cases, such as batch processing and stream processing use cases. Suitable transformations may include decoration of data with metadata, aggregation of data, division of data, logging of data, and so on. For example, the transformation specification format may be used to implement migration of data warehousing from one data warehousing environment (e.g., Oracle Real Application Clusters) to a different data warehousing environment (e.g., Apache Spark). As another example, the transformation specification format may be used to implement call/response patterns for RESTful (representational state transfer) APIs (application programming interfaces). As a further example, the transformation specification format may be used to implement queue processing for transformation and data chunking, e.g., for streamed data. As yet another example, the transformation specification format may be used to implement logic for database indexing, including the ability to redefine index configurations in real-time. Additionally, the transformation specification format may be used to implement engine-independent transformations in data analytics, machine learning pipelining, log manipulation, database micro-batch ingestion, and many other domains.

A transformation specification document may also be referred to as a transformation specification, closure, or closure document. A transformation specification that is written in accordance with the transformation specification format may indicate one or more tasks to be performed. However, the transformation specification may not specify the logic or include compiled program instructions to be used in implementing a particular task. The various execution engines 150 may implement the logic to perform the tasks and may register their ability to perform various types of tasks with the coordinator 100. The coordinator 100 may include an execution engine registration component 120 that maintains registration information in a centralized manner. The registration information may link each of the execution engines 150 to one or more types of transformations that a particular engine is capable of performing. In one embodiment, each execution engine may register itself (e.g., its task types) with the registration component 120 using an API or other programmatic interface. For example, the execution engine 150A may register one or more transformation types associated with one or more transformations 160A, and the execution engine 150N may register one or more transformation types associated with one or more transformations 160N. Although engines 150A-150N are shown for purposes of illustration and example, any suitable number and configuration of execution engines 150 may be orchestrated by the coordinator 100. The execution engines may include massive scale data processing engines.

By making the transformation specification independent of the underlying execution engine, the same transformation specification may potentially be used with multiple different execution engines 150, e.g., as selected by the client or by an automated system. In one embodiment, an execution engine may be upgraded to a newer version and may continue to be used with the same transformation specification(s) as before the upgrade. In one embodiment, an execution engine may be rolled back to an older version and may continue to be used with the same transformation specification(s) as before the rollback. In one embodiment, the same execution engine may be used with different transformation specifications 110 and/or different versions of a particular transformation specification. The task coordinator 100 may implement version management for the documents 110 such that different versions of the same transformation specification document may be stored concurrently. In one embodiment, different versions of the same engine may be tested with the same transformation specification(s) to assess performance. By enabling the same execution engine to be used with different transformation specifications 110 and the same transformation specification to be used with different execution engines 150, a transformation-specific service need not necessarily be used for each type of transformation. Using prior approaches, new services were often developed for each type of transformation, typically requiring weeks or months of developer time. Using the common format described herein, new transformations may be implemented quickly and with much less developer effort than would typically be required to develop new services.

Transformation specifications 110 may express functional transformations over data producers 180, also referred to as data sources. In one embodiment, a transformation specification may indicate a set of one or more data consumers (e.g., from the available data consumers 180), data transformations (e.g., from the transformations 160A-160N registered by the engines 150A), and one or more data consumers, also referred to as data sinks (e.g., targets for transformed data, such as the data consumers(s) 190). Data sources 180 may include database systems, data stores, tables, repositories, storage services, sources of streaming data, streams, queues, memory locations, and so on. Data sinks 190 may include database systems, data stores, tables, repositories, storage services, streams, queues, memory locations, and other components and destinations. For example, a particular transformation specification may instruct an execution engine to take two columns from a particular database table, apply a left join to the two columns, and store the result in another table. As another example, a particular transformation specification may instruct an execution engine to query a particular REST node with a particular URL (uniform resource locator), expect a JSON (JavaScript object notation) document having a particular syntax, and merge the JSON document with another JSON document. In one embodiment, the same service or component may be used as both a data producer and data consumer, e.g., with a call-response execution engine. A transformation specification may be written manually or using a builder function or service and then stored by the coordinator 100.

In one embodiment, a transformation specification may indicate a definition including its name, its description, and an indication of the platforms on which it can run and/or a problem domain to which it belongs (e.g., batch processing or stream processing). In one embodiment, a transformation specification may indicate a series of links between nodes (e.g., as a pointer to a polytree) and the node definitions. In one embodiment, a transformation specification may explicitly include or reference a graph, directed graph, directed acyclic graph, or polytree. In one embodiment, a transformation specification may implicitly include or reference a graph, directed graph, directed acyclic graph, or polytree, e.g., using structured data that can be mapped to a graph-like structure. A transformation specification may be said to represent a graph of nodes, whether the specification includes or references the graph explicitly or implicitly.

In one embodiment, a client 140 may use the task coordinator 100 to build a transformation specification document that performs a data transform as an SQL-like batch data processing job. The client (e.g., a user associated with the client) may use a user interface associated with the coordinator 100 to view a curated list of datasets to which the client has read access. The client may select one or more of those datasets to be used as data producers for the new job. The client may use another aspect of the user interface to apply filters, simple joins, and logical expressions to curate the data set with respect to a critical set of attributes. The client may then indicate one or more data consumers for the curated dataset, e.g., a destination or target from which the curated dataset can be picked up by downstream services. The document may be built by the coordinator 100 based on the client's indication of the desired data producers(s), transformation(s), and data consumers(s). As a further example of such a task, a product manager at an online retailer may select a merchant, product ID, and offer feature tables as the data sources. The product manager may indicate that filters should be applied to select only professional sellers, product IDs with high user ratings, and qualifying offers. The product manager may indicate that the merchant data, product ID data, and offer data should be joined to get a curated list of high value and high star ratings. The product manager may then indicate that the curated dataset should be published back to the system or service that provided the source data. Additionally, the product manager may indicate that sellers should be sent notifications that these high value offers qualify for special treatment by the merchant in order to boost sales. Such a transformation specification document may be executed using an execution engine that is registered to perform the transformation tasks specified in the document, e.g., a batch engine that can perform data joins.

In one embodiment, a client 140 may use the task coordinator 100 to build a transformation specification document that performs inventory pipeline processing as a stream processing job. The client (e.g., a user associated with the client) may indicate that the data source is a particular stream available on a data streaming service, and the input data represents an inventory event (e.g., associated with an online merchant) including the marketplace, seller, product ID, fulfillment network, quantity, and timestamp of the event. The client may seek to query a particular table to filter out updates to non-professional sellers and also query an inventory analyzer service to retrieve twenty-one sales information. The client may then seek to use the sales information and current inventory quantity to predict when the product will go out of stock, create a low inventory notification to the seller if it will go out of stock in under twenty-one days, create an out of stock notification to the seller if the quantity is zero, and deindex any current seller notifications for that offer if neither condition is met. By simply building such a transformation specification document, a developer need not have to code and maintain the business logic as a separate service or executable component. Additionally, a business-oriented client could update the transformation specification document without having to change any underlying executable program code, e.g., to account for inbound quantity and not create a low inventory notification to the seller if an inbound shipment will be received before the item is predicted to be out of stock. Such a transformation specification document may be executed using an execution engine that is registered to perform the transformation tasks specified in the document, e.g., a streaming engine.

Figure 7:
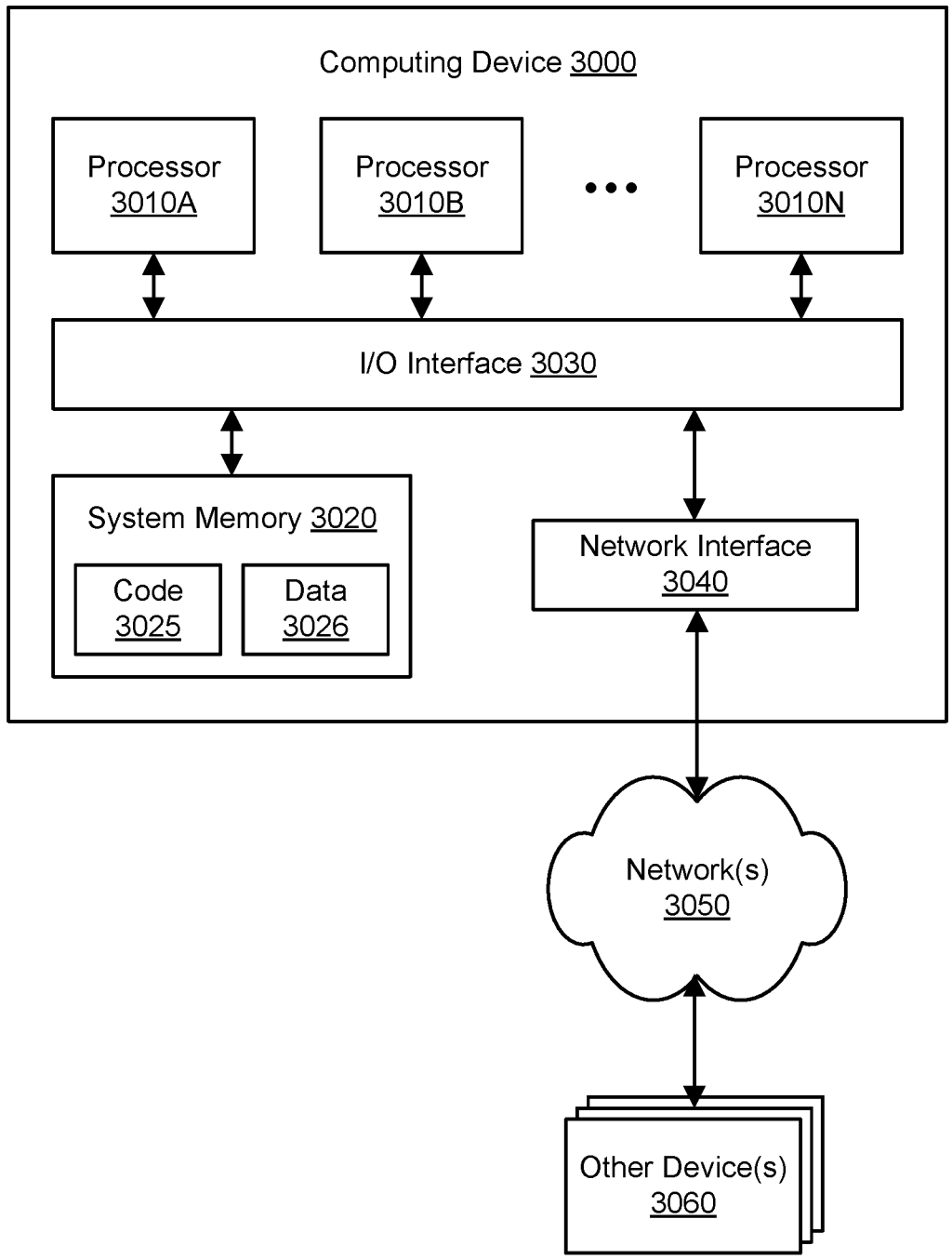
FIG. 7 illustrates an example computing device that may be used in some embodiments.

An execution engine may also be referred to as a compute engine or an execution environment. An execution engine may include or be associated with one or more systems, services, or other components that implement tasks specified in a transformation specification. Any of the systems, services, or other components of an execution engine may be built on one or more computing devices such as the example computing device 3000 as illustrated in FIG. 7. The various execution engines 150 usable with the transformation specification format may vary in terms of their underlying configurations. The execution engines 150 may include MapReduce-based cluster computing environments, stream processing systems, workflow systems such as Amazon Simple Workflow Service, and other suitable environments. In one embodiment, an execution engine may be implemented using a cluster of computing devices that cooperate to execute data transformations (such as transformations 160A or 160N). A cluster may be provisioned, launched, or otherwise spun up in order to perform one or more transformations associated with a transformation specification. In one embodiment, a particular execution engine may use an orchestration framework such as Apache Hadoop, Apache Spark, and so on to manage a cluster. A particular execution engine may register the types of operations it can perform with the coordinator 100. For example, one execution engine may inform the coordinator 100 that the engine is a batch engine that can perform join operations on data sets.

In one embodiment, the coordinator 100 may store the transformation specifications 110 as expressed according to the transformation specification format. A transformation specification may be passed to an execution engine for execution of the transformation(s). The coordinator 100 may include an execution engine selection component 130 that selects particular execution engines for execution of particular transformation specification documents. The execution engine may be selected for processing of a transformation specification on any suitable basis. In one embodiment, the execution engine may be selected based (at least in part) on the registration 120 of operations that the engine can perform. In one embodiment, the execution engine may be selected based (at least in part) on a definition in a transformation specification document or on other input from the client associated with the transformation specification, e.g., from among execution engines 150 that can perform that type of operation. For example, a platform definition in one of the documents 110 may indicate the types of platforms and/or engines on which the specified tasks can be executed. If no engine has registered a required operation for a particular transformation specification, then the processing of that transformation specification may be halted due to error.

The coordinator 100 may know how to select the execution engine and provide the document to the selected engine; however, the details of the execution may be unknown to the coordinator. In one embodiment, an execution engine may implement a main method that receives a transformation specification as its argument and instantiates or provisions any components of the execution environment, e.g., for cluster management. After receiving the document and instantiating or provisioning any components of the execution environment, the execution engine may then perform the tree walk technique on the transformation specification to execute one or more transformations, e.g., by invoking a tree walk function that is bundled with the engine or otherwise accessible to the engine. In one embodiment, an output may be returned by the execution engine after the transformation is performed, e.g., to the coordinator 100 and/or to a specified data consumer. The nature of the output may vary based (at least in part) on the problem domain associated with the engine. For example, a batch engine may return an object called a data frame, a streaming engine may return a JSON object, and a call-response engine may return a call-response document.

The coordinator 100 and execution engines 150 may be implemented using any suitable number and configuration of computing devices, any of which may be implemented by the example computing device 3000 illustrated in FIG. 7. The computing devices may be located in any suitable number of data centers or geographical locations. In various embodiments, at least some of the functionality of the coordinator 100 and execution engines 150 may be provided by the same computing device or by different computing devices. If any of the components of the coordinator 100 and execution engines 150 are implemented using different computing devices, then the components and their respective computing devices may be communicatively coupled, e.g., via one or more networks. Each of the components of the coordinator 100 and execution engines 150 may represent any combination of software and hardware usable to perform their respective functions, as discussed as follows. Operations implemented by the coordinator 100 and execution engines 150 may be performed automatically, e.g., without a need for user initiation or user intervention after an initial configuration stage, and programmatically, e.g., by execution of program instructions on at least one computing device. It is contemplated that the coordinator 100 and execution engines 150 may include additional components not shown, fewer components than shown, or different combinations, configurations, or quantities of the components shown.

The coordinator 100 may be implemented in a service-oriented system in which multiple services (such as the execution engines 150) collaborate according to a service-oriented architecture. In such an environment, the coordinator 100 may offer its functionality as service to multiple clients. In one embodiment, any of the clients 140 may provide one or more transformation specifications 110 to be executed using the execution engines 150. It is contemplated that any suitable number and configuration of clients may interact with the coordinator 100. To enable client(s) 140 to invoke their functionality, the coordinator 100 may expose any suitable interface(s), such as one or more APIs or other programmatic interfaces and/or graphical user interfaces (GUIs). A service of the coordinator 100 may be implemented using a plurality of different instances that are distributed throughout one or more networks, and each instance may offer access to the functionality of the corresponding service to various clients. The functionality of the coordinator 100 may be offered to the client(s) 140 in exchange for fees.

One or more of the clients 140 may represent external devices, systems, or entities with respect to any services or components of the coordinator 100 and/or execution engines 150. The client device(s) 140 may be implemented using any suitable number and configuration of computing devices, any of which may be implemented by the example computing device 3000 illustrated in FIG. 7. Client(s) 140 may convey network-based service requests to the coordinator 100 via one or more networks, e.g., to supply the documents 110. In various embodiments, the network(s) may encompass any suitable combination of networking hardware and protocols necessary to establish network-based communications between client device(s) 140 and the coordinator 100. For example, the network(s) may generally encompass the various telecommunications networks and service providers that collectively implement the Internet. The network(s) may also include private networks such as local area networks (LANs) or wide area networks (WANs) as well as public or private wireless networks. For example, both a given client device and the coordinator 100 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the coordinator 100. It is noted that in some embodiments, client device(s) 140 may communicate with the coordinator 100 using a private network rather than the public Internet. In various embodiments, the coordinator 100 may also communicate with the execution engines 150 using one or more network interconnects.

In one embodiment, aspects of the coordinator 100, execution engines 150, data source(s) 180, and/or data sink(s) 190 may be implemented using computing resources of a provider network. A provider network may represent a network set up by an entity such as a company or a public sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network. For example, different ones of the execution engines 150 may be concurrently used for the processing of data by different clients.

In some embodiments, an operator of the provider network may implement a flexible set of resource reservation, control, and access interfaces for their clients. For example, a resource manager may implement a programmatic resource reservation interface (e.g., via a web site or a set of web pages) that allows clients (potentially including other components within the provider network) to learn about, select, purchase access to, and/or reserve compute instances offered by the provider network. Such an interface may include capabilities to allow browsing of a resource catalog and provide details and specifications of the different types or sizes of resources supported, the different reservation types or modes supported, pricing models, and so on.

The provider network may support several different purchasing modes (which may also be referred to herein as reservation modes) in one embodiment: for example, long-term reservations, on-demand resource allocation, or spot-price-based resource allocation. Using the long-term reservation mode, a client may make a low, one-time, upfront payment for a resource instance, reserve it for a specified duration such as a one-year or three-year term, and pay a low hourly rate for the instance; the client may be assured of having the reserved instance available for the term of the reservation. Using on-demand mode, a client could pay for capacity by the hour (or some appropriate time unit), without any long-term commitments or upfront payments. In the spot-price mode, a client could specify the maximum price per unit time that it is willing to pay for a particular type of resource, and if the client's maximum price exceeded a dynamic spot price determined at least in part by supply and demand, that type of resource would be provided to the client. In some embodiments, dynamically resizable pools of resource instances may be set aside for the different reservation types or modes: e.g., long-term reserved instances may be allocated from one pool, on-demand instances from another, and so on. During periods when the supply of the requested resource type exceeds the demand, the spot price may become significantly lower than the price for on-demand mode. In some implementations, if the spot price increases beyond the maximum bid specified by a client, a resource allocation may be interrupted: i.e., a resource instance that was previously allocated to the client may be reclaimed by the resource manager and may be allocated to some other client that is willing to pay a higher price. Other purchasing modes or combinations of modes may be implemented by the resource manager in some embodiments.

Figure 2:
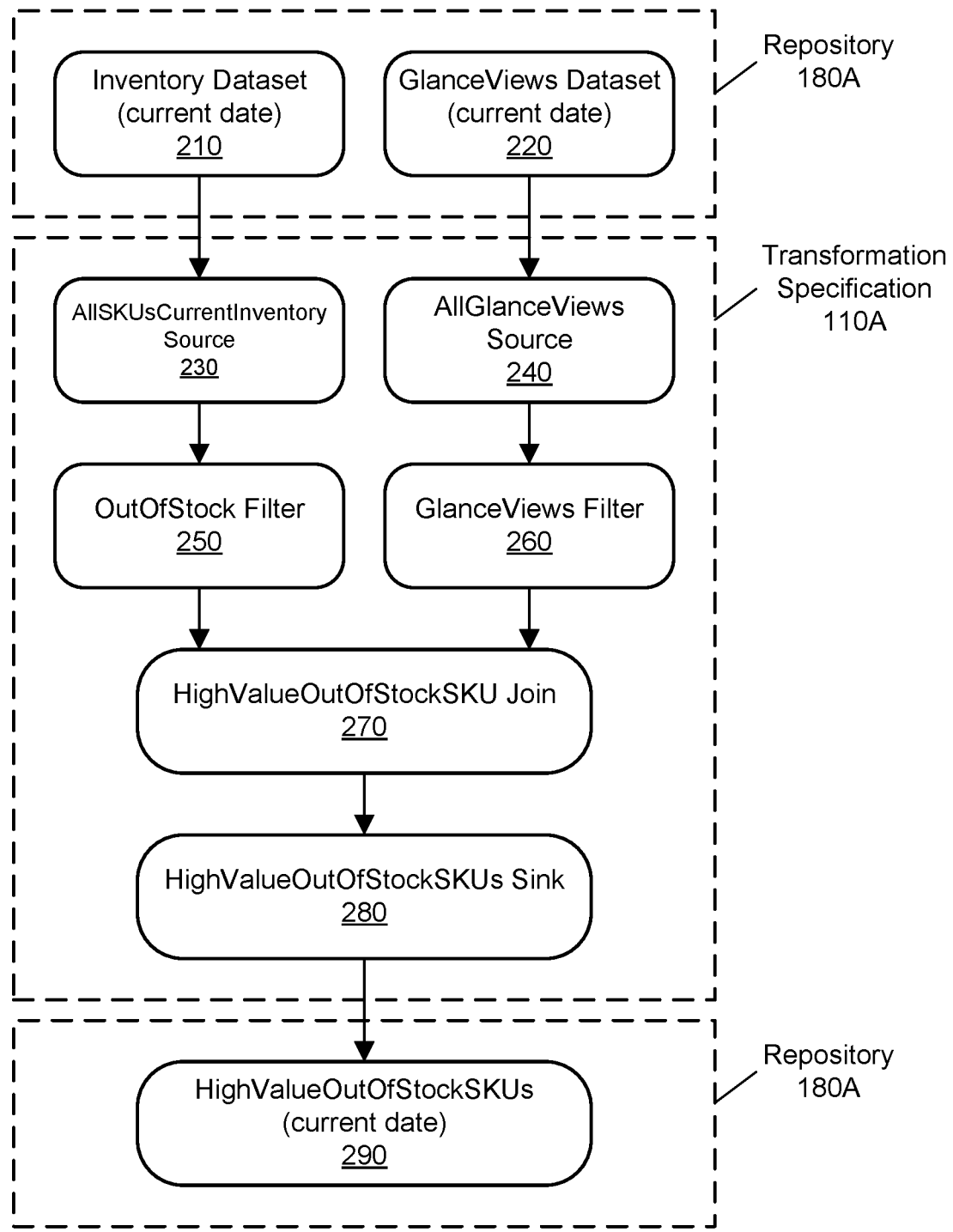
FIG. 2 illustrates an example of a transformation specification expressed according to a common transformation specification format, according to one embodiment.

FIG. 2 illustrates an example of a transformation specification expressed according to a common transformation specification format, according to one embodiment. In one embodiment, a transformation specification may describe transforms using a directed graph or polytree. A polytree may represent a directed acyclic graph whose underlying undirected graph is a tree. A polytree in a transformation specification may include multiple root nodes and/or multiple leaf nodes. A particular leaf node in a polytree may descend from two or more root nodes. The example transformation specification 110A shown in FIG. 2 includes nodes representing two data sources 230 and 240. Source node 230 may correspond to actual source dataset 210 in a repository 180A, and source node 240 may correspond to actual source dataset 220 in the repository 180A. The source dataset 210 may represent inventory of an online marketplace at a current date and may include attributes such as marketplace, seller, product ID, SKU (stock-keeping unit), and current inventory quantity, e.g., in tab-separated value format. The other source dataset 220 may represent glance views (or page views) by potential customers in the online marketplace and may include attribute such as marketplace, product ID, and glance views for the past thirty days in a JSON-like format. The document 110A may represent a desire to provide a list of every SKU with quantity of zero and glance views greater than 10,000 so that sellers can be notified of high value items that are out of stock. Using a graphical user interface associated with the coordinator 100 to specify data sources, data transformations, and a data sink, a client may build the polytree shown in FIG. 2. The source node 230 may represent all SKUs in the current inventory, as acquired from the corresponding dataset 210. The source node 240 may represent all glance views in the last thirty days, as acquired from the corresponding dataset 220. The transformation node 250 may represent an out of stock filter, and the transformation node 260 may represent a glance views filter to determine which items have received more than 10,000 glance views in the relevant time frame. The further downstream transformation node 270 may represent a join of the two filtered datasets to determine high value SKUs that are out of stock. A sink node 280 may represent the output and may correspond to a dataset in the repository 290 in which the output should be stored.

In one embodiment, to build a transformation specification, a client may specify input data schemas that correspond to root (source) nodes of a tree. The client may also specify schemas for a series of branch nodes that transform, compute, filter, or join their input data into new attribute sets. The client may further specify schemas for one or more leaf (sink) nodes that correspond to outputs for the tree. A sink node may represent a mapping of input attributes to output attributes. Inputs to branch nodes may be root nodes or other branch nodes, and outputs of branch nodes may be other branch nodes or leaf nodes. Typically a filter node may take one input, while a join node may take multiple inputs. The tree may be saved to serve as the high-level architecture for the desired computation. The client may generate a tree definition based on input such as the tree itself, an execution engine representing the desired computation platform, and a map of data sources to root nodes and leaf nodes to data sinks (destinations). The client may instruct the coordinator 100 to execute the tree definition, either now or on a schedule, and the coordinator 100 may orchestrate the execution of the tree on the selected execution engine. The engine may map the tree definition into own implementation, acquire data for the one or more root nodes, and collect output from the one or more leaf nodes.

In one embodiment, the following schemas may represent the root node 230 and the data format of its input data:
root: {
name: all_skus_current_inventory,
data_format: inv_format
}
data_format: {

```
name: inv_format,
type: T,
fields: [
    {name: marketplace, type: string},
    {name: productID, type: string},
    {name: sku, type: string},
    {name: current_inventory_quantity, type: number}
]
}
```
In one embodiment, the following schemas may represent the root node 240 and the data_format of its input data:
```
root: {
name: all_productIDs_gv,
data_format: gv_format
}
data_format: {
name: gv_format,
type: JSON,
fields: [
    {name: marketplace, type: string},
    {name: productID, type: string},
    {name: glance_views_past_30_days, type: number}
]
}
```
In one embodiment, the following schema may represent the branch node 250:
```
branch: {
name: oos_filter,
type: filter,
source: all_skus_current_inventory,
condition:    all_skus_current_inventory.current_
    inventory_quantity=0
}
```
In one embodiment, the following schema may represent the branch node 260:
```
branch: {
name: gv_filter,
type: filter,
source: all_productIDs_gv,
condition:
    all_productIDs_gv.glance_views_past_30_days>10000
}
```
In one embodiment, the following schema may represent the branch node 270:
```
branch: {
name: high_value_oos_sku_join,
type: join,
source: [gv_filter, oos_filter],
condition:
    [[gv_filter.marketplace=oos_filter.marketplace],
    [gv_filter.productID=oos_filter.productID]]
}
```
In one embodiment, the following schemas may represent the leaf node 280 and the data format of the output data:
```
leaf: {
name: high_value_oos_skus,
data_format: high_value_oos_sku_format,
}
data_format: {
name: high_value_oos_sku_format,
type: JSON,
fields: [
    {name: marketplace, type: string},
    {name: productID, type: string},
    {name: sku, type: string},
    {name: current_inventory_quantity, type: number},
    {name: glance_views_past_30_days, type: number}
]
}
```
In one embodiment, a polytree based on the above-defined schemas may be defined as follows, e.g., for a pipeline-based execution engine:
```
definition: {
name: high_value_oos_pipeline,
engine: execution_engine_name,
sources: [
    {dataset: Inventory-${cur_date}, root: all_skus_current_inventory},
    {dataset: ProductIDGV${cur_date}, root: all_productIDs_gv},
],
destinations: [
    {leaf: high_value_oos_skus, dataset: HighValueOutOfStockSkus-${cur_date} }
]
}
```
After the schemas for the nodes in the polytree are generated based on client input, the transformation specification 110A may be saved by the task coordinator 100, potentially using versioning and promotion control. In one embodiment, a polytree as shown in the example of FIG. 2 may be presented to the client in a graphical user interface, and the client may manipulate and relink nodes to change the configuration of the tree. The client may specify which execution engine is desired for the branch nodes and also define the data source locations and the data sink location. The task coordinator 100 may then provide the document 110A to the selected execution engine to perform the described manipulations of the source data. For a streaming engine, the engine may launch an Apache Spark cluster, import the input data sets, run a streaming Spark join on the input data, generate an output dataset, and then halt the cluster. For a pipeline-based engine, the engine may launch a pipeline that would listen to the input data source for events, perform the join in real-time, and persist the output to the chosen data sink. In one embodiment, the pipeline would stay running until turned off by (or on behalf of) the client. For yet another type of execution engine, the engine may backfill from the source tables, perform the filters and join, project the data into an in-memory index, and keep the index up to date via event notifications. In this manner, different execution engines may perform similar tasks using different execution logic for the same platform-independent transformation specification document 110A.

In one embodiment, a tree walk technique may be used to walk the polytree in a transformation specification. The tree walk technique may begin with one of the root nodes, such as node 230 or node 240. Root nodes may also be referred to as source nodes. A root node may have an "active" aspect (such that the node can supply data without being queried) and/or a "passive" aspect (such that the node can supply data in response to being queried). For a batch processing specification, all the roots may be active, but some active nodes may also be queried as passive nodes. If only one of the root nodes is an active node, then the tree may be walked beginning with that node. If more than one of the root nodes are active nodes, then multiple active root nodes may be processed concurrently, or the tree may be walked beginning with a randomly selected active root node (or a root node selected on some other basis). If none of the root nodes are active nodes, then the tree may be walked beginning with a randomly selected passive root node (or a root node selected on some other basis). If multiple branch nodes descend from a single parent node, then the branches may be walked serially or concurrently and, if serially, breadth-first or depth-first.

The tree walk technique may proceed down the directed edges of the polytree through one or more transform nodes. A given transform node or sink node may require one or more inputs or sources. When a given node is reached, the tree walk technique may determine whether all the specified inputs for that node are ready. If all the inputs for the node are ready, then the node can be executed using an execution engine. For example, while proceeding from source node 230 to filter node 240, or from source node 240 to filter node 260, the single output required by the filter node should be available. However, if all the inputs for the given node are not ready, then the tree walk algorithm may walk back up the unvisited nodes (from which the given node descends) until finding an unvisited source node. For example, if join node 270 is encountered before its input is available from filter node 250 or filter node 260, then the tree may be walked back to the unvisited source node 230 or 240. An input may be acquired from that source node (e.g., by querying the corresponding data source, acquiring a data stream corresponding to the node, and so on). That input may be passed back down to the node that requires it, and the node can be executed using an execution engine.

Figure 3:
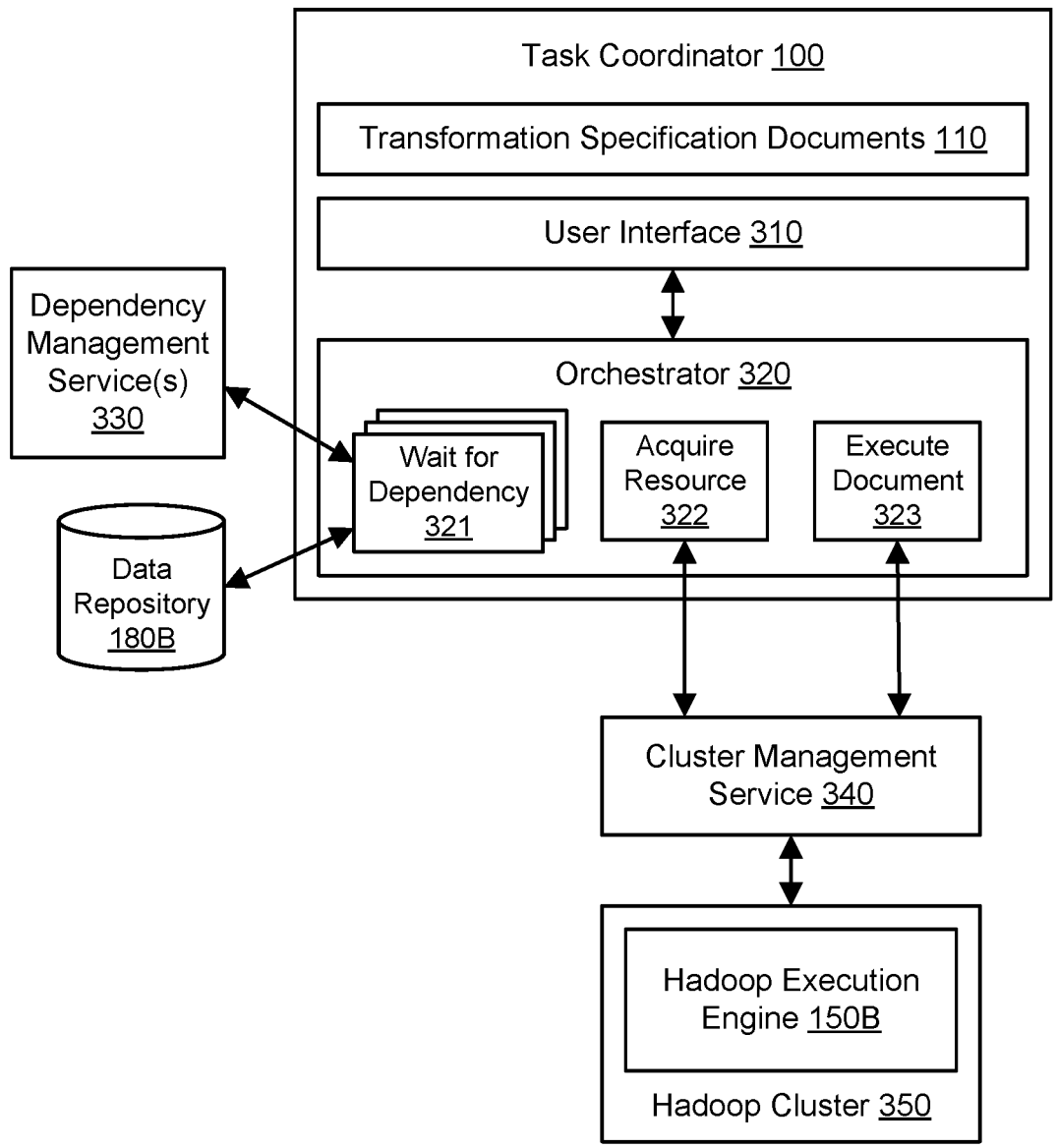
FIG. 3 illustrates further aspects of the example system environment for a transformation specification format usable with multiple execution engines, including the use of an execution engine configured for batch processing, according to one embodiment.

FIG. 3 illustrates further aspects of the example system environment for a transformation specification format usable with multiple execution engines, including the use of an execution engine configured for batch processing, according to one embodiment. The task coordinator 100 may include a user interface 310 through which the coordinator receives input from and presents output to one or more users associated with the client(s) 140. The user interface 310 may represent a graphical user interface (GUI), a command-line interface, a voice-enabled interface, and so on. After the user has generated a transformation specification document as discussed above, the user may use the interface 310 to instruct the coordinator 100 to execute the document. The document or other user input may indicate that the document should be executed using a Hadoop execution engine 150B that is managed by a cluster management service 140 such as Apache Hadoop YARN, Apache Mesos, Amazon Simple Workflow Service (SWF), or another suitable resource manager.

To perform the execution of the document using the selected execution engine 150B, an orchestrator component 320 may be used by the task coordinator 100 to implement a pipeline. One or more components (e.g., processes) 321 of the pipeline that wait for a dependency may be launched or activated. The wait for dependency process(es) 321 may call one or more dependency management services 330 to determine whether a scheduled load is completed. The wait for dependency process(es) 321 may also call a data repository 180B to determine whether the input dataset exists. An acquire resource component (e.g., process) 322 may identify available clusters by interacting with the cluster management service 340. The acquire resource process 322 may start a new cluster if no clusters are available for execution of the document. The cluster management service 340 may spawn a new Hadoop cluster 350 or potentially re-use an existing cluster, e.g., a cluster previously used on behalf of the same client. The Hadoop cluster 350 may include a plurality of computing devices that may be implemented by the example computing device 3000 shown in FIG. 7. The Hadoop cluster 350 may implement the Hadoop execution engine 150B that is associated with the document. An execute document component (e.g., process) 323 may then call the Hadoop service 340 to add the document to the cluster. The cluster management service 340 may then run the execution engine 150B as a step on the cluster 350. The engine 150B may acquire input data from the repository 180B, perform any transforms specified in the document, and provide output data back to the repository. At various points in time, the user interface 310 may poll the orchestrator 320 for the job status of the document execution.

Figure 4:
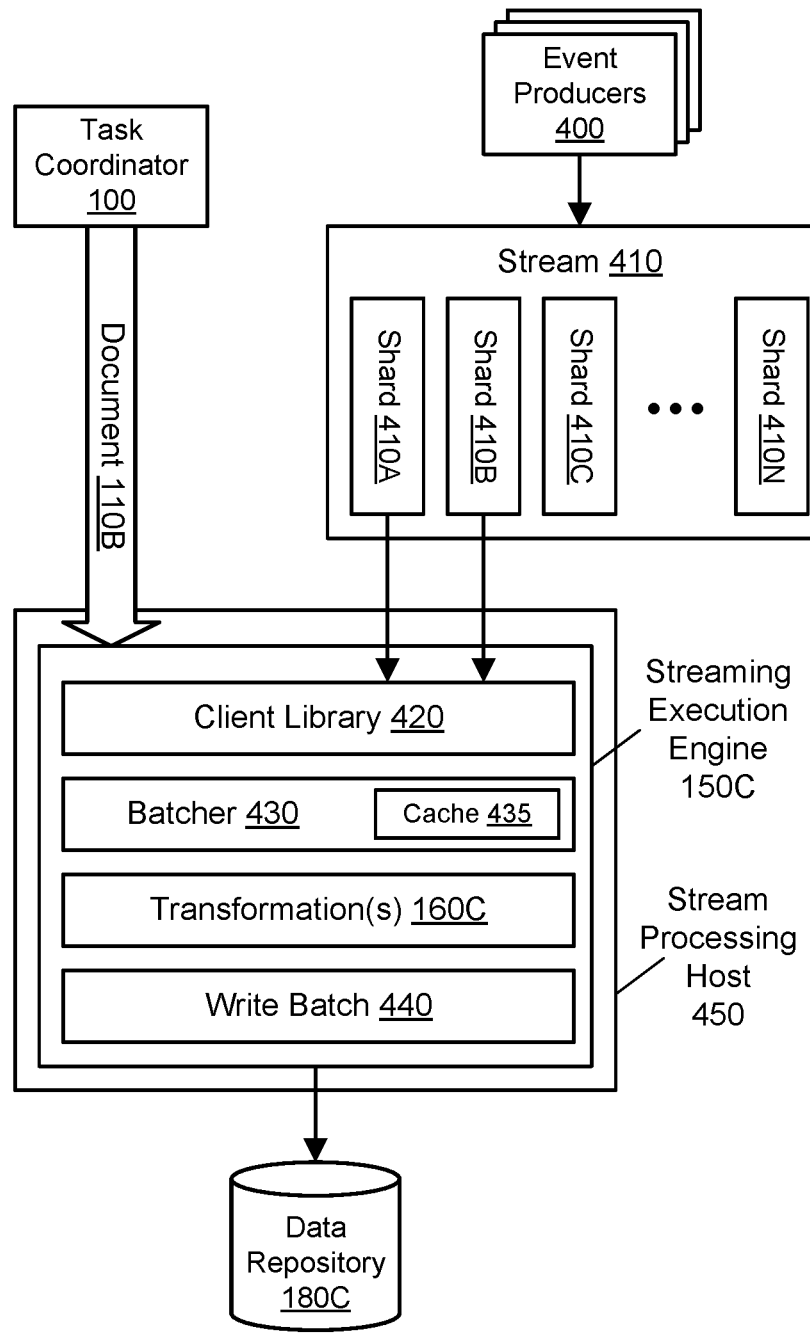
FIG. 4 illustrates further aspects of the example system environment for a transformation specification format usable with multiple execution engines, including the use of an execution engine configured for stream processing, according to one embodiment.

FIG. 4 illustrates further aspects of the example system environment for a transformation specification format usable with multiple execution engines, including the use of an execution engine configured for stream processing, according to one embodiment. A cluster configured for stream processing may include one or more stream processing hosts such as host 450. The stream processing hosts may implement a streaming execution engine 150C for a stream-processing framework such as Apache Spark, Apache Flink, or Apache Storm. When a document 110B is to be executed, and the streaming execution engine 150C is selected for execution of the document, then the host(s) (including host 450) may accept a tree definition identifier via an API call. The API call may start a pipeline that calls the task coordinator 100 to retrieve the transformation specification document 110B associated with the tree definition identifier, read any engine-specific arguments from the document (e.g., credentials for accessing data sources and data sinks), map root nodes to data sources, map leaf nodes to data sinks, map individual tree nodes to reaction steps via a reaction graph, and execute the pipeline. In the example streaming environment shown in FIG. 4, one or more event producers 400 may write events to a stream 410 at various points in time, e.g., as transactions are processed. The stream 410 may include transactional data, log data, and so on.

The stream may include numerous shards such as shards 410A, 410B, and 410C through 410N. The document to be executed may specify that input data should be acquired from one or more of the shards, e.g., shards 410A and 410B that correspond to two root nodes in the polytree. For a streaming system, the root nodes may be "active" nodes that do not have a passive aspect and are not queryable. At various points in time, a client library 420 associated with the streaming system may acquire elements of data from the shards 410A and 410B. The acquired data may be aggregated by a batcher component 430 that stores the data in a locally accessible cache 435. In one embodiment, the acquired data may be aggregated into batches of a particular size before being subjected to the transformation(s) 160C specified in the document. The streaming execution engine 150C may then apply the specified transformation(s) 160C to the latest batch of acquired data. The execution engine 150C may then use a write batch component 440 to output the results to one or more destinations such as data repository 180C.

Figure 5:
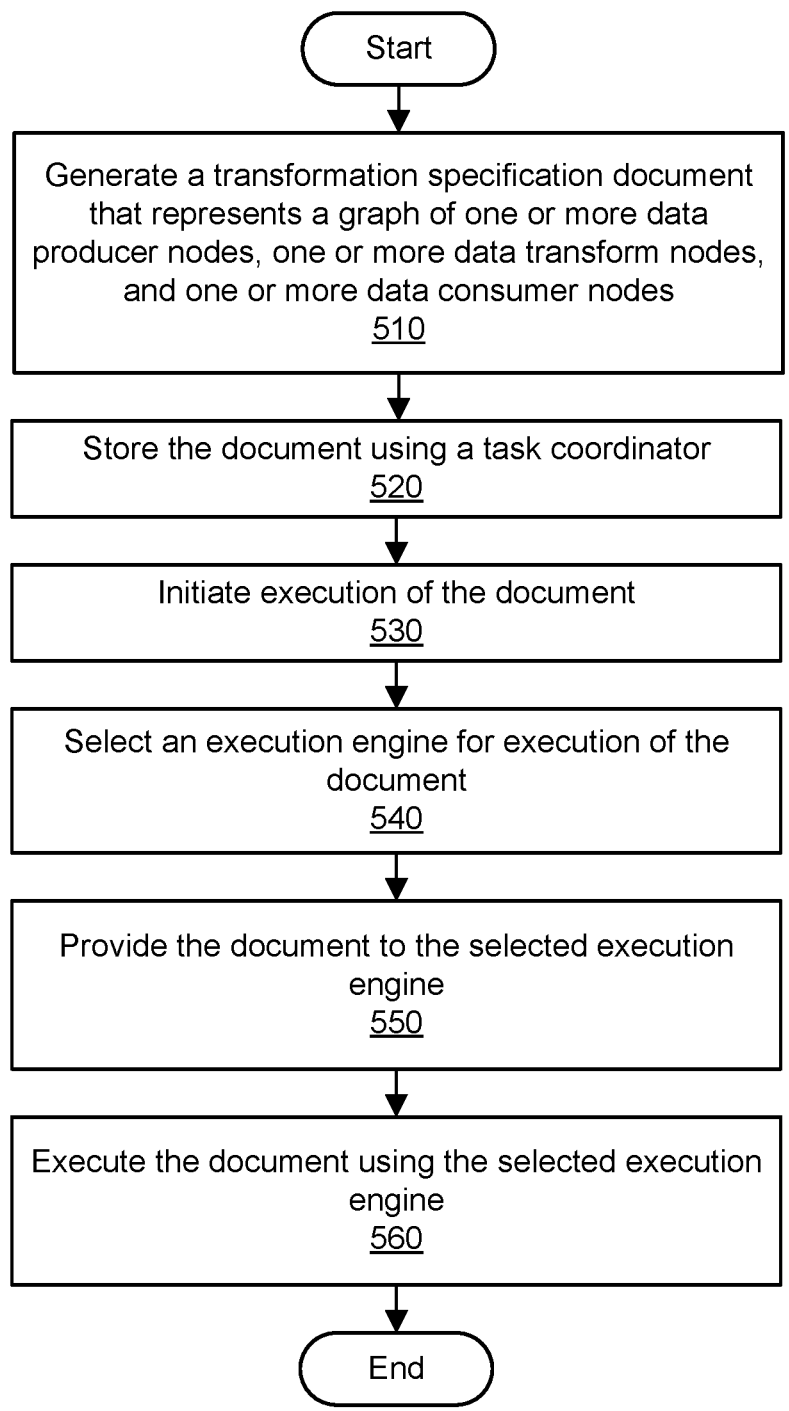
FIG. 5 is a flowchart illustrating a method for using a transformation specification format usable with multiple execution engines, according to one embodiment.

FIG. 5 is a flowchart illustrating a method for using a transformation specification format usable with multiple execution engines, according to one embodiment. As shown in 510, a transformation specification document may be generated. The document may be written manually by a user or may be built by an automated system based on user input, e.g., input to a GUI associated with a task coordinator. The document may be expressed according to the transformation specification format. The document may indicate one or more tasks to be performed, e.g., as transform nodes in a polytree or other graph that also includes one or more data producer (source) nodes and one or more data consumer (sink) nodes. However, the document may not specify the logic or compiled program instructions to be used in implementing a particular task corresponding to a transform node. In one embodiment, a transformation specification document may indicate a definition including its name, its description, and an indication of the platforms on which it can run and/or a problem domain to which it belongs (e.g., batch processing or stream processing). In one embodiment, a transformation specification document may indicate a series of links between nodes (e.g., as a pointer to a polytree) and the node definitions.

As shown in 520, the document may be stored using the task coordinator, also known as a task coordination system. The task coordinator may store the document in locally accessible storage or using an external storage service to which the task coordinator has access. The task coordinator may implement version management for transformation specification documents such that different versions of the same transformation specification document may be stored concurrently. As shown in 530, execution of the document may be initiated. The execution may be initiated immediately based on user input, with a delay based on a user-defined schedule, with a delay based on a system-defined schedule, or on any other suitable basis.

As shown in 540, an execution engine may be selected for execution of the document. The execution engine may be selected from a plurality of available execution engines that are configured to execute documents expressed in the transformation specification format. Although the capabilities and configurations of the various execution engines may differ, the same transformation specification format may be used for different transformation specification documents that are executed using the different engines. The documents (and the format they share) may be said to be independent of the execution engines, such that the documents are not necessarily tied to a format specific to any of the execution engines. The documents may describe tasks to be performed in a high-level and/or generic manner, and the execution engines may implement the actual logic for executing such tasks. The details of the task execution by the engines (e.g., the program instructions used for task execution) may be unknown to the task coordinator.

The various execution engines may register their ability to perform various types of tasks with the task coordinator. The registration information may link each of the execution engines to one or more types of transformations that a particular engine is capable of performing. In one embodiment, the execution engine for a document may be selected based at least in part on this registration information, such that documents are assigned to platforms that are capable of executing them. In one embodiment, the execution engine for a document may be selected based at least in part on metadata associated with the document, e.g., a name or identifier of the execution engine that the user seeks to use for execution of the document, As shown in 550, the document may be provided to the selected execution engine. In one embodiment, the execution engine may implement a main method that receives a transformation specification document as its argument and instantiates or provisions any components of the execution environment, e.g., for cluster management. The various execution engines usable with the transformation specification format may vary in terms of their underlying configurations. For example, the execution engines may include MapReduce-based cluster computing environments, workflow systems such as Amazon Simple Workflow Service, and other suitable environments. In one embodiment, the selected execution engine may be implemented on a cluster of computing devices that cooperate to execute data transformations. A cluster may be provisioned, launched, or otherwise spun up in order to perform one or more transformations associated with a transformation specification. In one embodiment, the selected execution engine may use an orchestration framework such as Apache Hadoop, Apache Spark, and so on to manage a cluster.

As shown in 560, the document may be executed using the selected execution engine and its associated computing resources (e.g., a cluster of computing devices). After receiving the document and instantiating or provisioning any components of the execution environment, the execution engine may then perform a tree walk technique on the transformation specification to execute one or more transformations, e.g., by invoking a tree walk function that is bundled with the engine or otherwise accessible to the engine. In one embodiment, an output may be returned by the execution engine after the transformation is performed, e.g., to the task coordinator and/or to a specified data sink corresponding to a sink node in the tree or graph.

Figure 6:
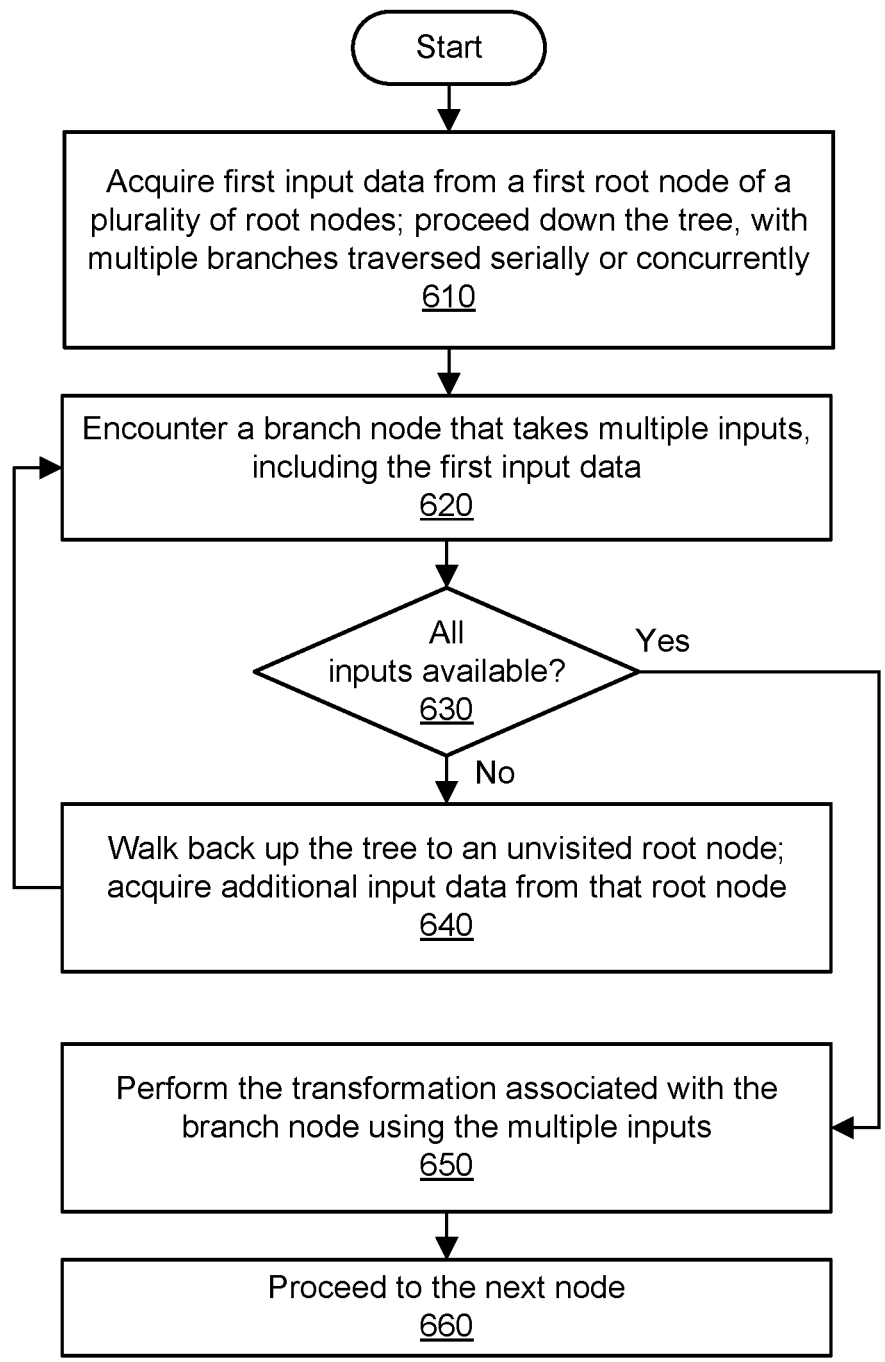
FIG. 6 is a flowchart illustrating a method for walking a polytree or other graph in a transformation specification usable with multiple execution engines, according to one embodiment.

FIG. 6 is a flowchart illustrating a method for walking a polytree in a transformation specification usable with multiple execution engines, according to one embodiment. The method shown in FIG. 6 may represent a tree walk technique that is performed during document execution (e.g., as shown in 560 of FIG. 5). The tree walk technique may be used to walk the graph or polytree represented in a transformation specification, and the polytree may include multiple root nodes representing data producers or data sources. As shown in 610, the tree walk technique may begin with a first root node and may acquire first input data from that node. A root node may have an "active" aspect (such that the node can supply data without being queried) and/or a "passive" aspect (such that the node can supply data in response to being queried). If only one of the root nodes is an active node, then the tree may be walked beginning with that node. If more than one of the root nodes are active nodes, then multiple active root nodes may be processed concurrently, or the tree may be walked beginning with a randomly selected active root node (or a root node selected on some other basis). If none of the root nodes are active nodes, then the tree may be walked beginning with a randomly selected passive root node (or a root node selected on some other basis). If multiple branch nodes descend from the chosen source node, then the branches may be walked serially or concurrently and, if serially, breadth-first or depth-first.

The tree walk technique may proceed down the directed edges of the polytree. As shown in 620, a branch node may be encountered that takes multiple inputs, including the first input data acquired from the first root node. The branch node may represent a data transformation using the multiple inputs to produce an output. For example, the branch node may represent a join of two datasets. As shown in 630, the tree walk technique may determine whether all the specified inputs for that node are ready. As shown in 640, if all the inputs for the branch node are not ready, then the tree walk technique may walk back up the unvisited nodes (from which the branch node descends) until finding an unvisited root node. The branch node may descend from the unvisited root node with no intermediate nodes or with one or more other branch nodes as intermediate nodes. Additional input data may be acquired from that root node, e.g., by querying the corresponding data source. That additional input may be passed back down to the branch node that requires it. The decision shown in 630 may be performed again until all the inputs for the branch node are available.

If all the inputs for the node are ready, then as shown in 650, the transformation associated with the branch node may be performed using the multiple inputs to produce an output. As shown in 660, the tree walk technique may proceed to the next node downstream from the branch node. The next node may represent another branch node representing another data transformation or a leaf node representing a data sink. If the next node is another branch node that requires multiple inputs, then any of the operations shown in 620-640 may be performed again until all the required inputs are available. In this manner, the execution of a transformation specification document walk may begin with acquisition of a single data source but acquire additional data sources as needed, e.g., by using a tree walk technique to walk back upstream from a branch node.

Illustrative Computer System

In at least some embodiments, a computer system that implements a portion or all of one or more of the technologies described herein may include a computer system that includes or is configured to access one or more computer-readable media. FIG. 7 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   one or more computing devices comprising one or more processors and memory and configured to implement a task coordination system, wherein the task coordination system is configured to:
   store a plurality of transformation specification documents, wherein the transformation specification documents are expressed according to a transformation specification format, wherein the transformation specification documents include a first transformation specification document, and wherein the first transformation specification document represents a graph linking one or more data producer nodes, one or more data transformation nodes representing one or more types of transformations, and one or more data consumer nodes;
   select an execution engine for execution of the first transformation specification document, wherein the execution engine manages one or more computing devices, wherein the execution engine is registered with the task coordination system to perform the one or more types of transformations, wherein the execution engine is selected from among a plurality of available execution engines based at least in part on the one or more types of transformations for which the execution engine is registered, wherein the plurality of available execution engines comprises an additional execution engine that is registered with the task coordination system to perform a different set of transformations than the execution engine, and wherein the different set of transformations comprises one or more additional types of transformations and not the one or more types of transformations; and
   provide the first transformation specification document to the execution engine, wherein the execution engine acquires data from one or more data producers corresponding to the one or more data producer nodes, wherein the execution engine performs one or more transformations of the data corresponding to the one or more data transformation nodes, and wherein the execution engine outputs one or more results of the one or more transformations to one or more data consumers corresponding to the one or more data consumer nodes.

2. The system as recited in claim 1, wherein a first registration indicating the one or more types of transformations is provided to the task coordination system by the execution engine, and wherein a second registration indicating the one or more additional types of transformations is provided to the task coordination system by the additional execution engine.

3. The system as recited in claim 1, wherein the graph represents a polytree, wherein the polytree comprises a first root node and a second root node representing the data producer nodes, and wherein the task coordination system is configured to:
   acquire first data from a first data producer corresponding to the first root node;
   encounter a particular one of the data transformation nodes that uses a plurality of inputs, including the first data from the first data source and second data from a second data producer corresponding to the second root node;
   walk back up the polytree to the second root node;
   acquire the second data from the second data producer corresponding to the second root node; and
   perform a data transformation corresponding to the particular one of the data transformation nodes using the first data and the second data.

4. The system as recited in claim 1, wherein the graph represents a polytree, wherein a first data producer node of the polytree represents an active data source, and wherein a second data producer node of the polytree represents a passive data source that is queryable for second data after first data is acquired from the active data source.

5. A computer-implemented method, comprising:
   performing, by one or more computing devices comprising one or more processors and memory:
   storing a transformation specification, wherein the transformation specification is expressed according to a transformation specification format, wherein the transformation specification represents a graph linking one or more data producer nodes, one or more data transformation nodes representing one or more types of transformations, and one or more data consumer nodes;
   selecting an execution engine for execution of the transformation specification, wherein the execution engine is selected from among a set of available execution engines based at least in part on a registration of the execution engine to perform the one or more types of transformations, and wherein the set of available execution engines comprises an additional execution engine that is registered to perform one or more additional types of transformations and not the one or more types of transformations; and using the execution engine to acquire data from one or more data producers corresponding to the one or more data producer nodes, perform one or more transformations of the data corresponding to the one or more data transformation nodes, and output one or more results of the one or more transformations to one or more data consumers corresponding to the one or more data consumer nodes.

6. The method as recited in claim 5, wherein a coordinator stores the registration of the execution engine to perform the one or more types of transformations, wherein the registration is provided to the coordinator by the execution engine, and wherein the execution engine is selected by the coordinator from among the plurality of available execution engines based at least in part on the registration.

7. The method as recited in claim 5, wherein the graph comprises a polytree.

8. The method as recited in claim 7, wherein the polytree comprises a first root node and a second root node representing the data producer nodes, and wherein the method further comprises:
    acquiring first data from a first data producer corresponding to the first root node;
    encountering a particular one of the data transformation nodes that uses a plurality of inputs, including the first data from the first data source and second data from a second data producer corresponding to the second root node;
    walking back up the polytree to the second root node;
    acquiring the second data from the second data producer corresponding to the second root node; and
    performing a data transformation corresponding to the particular one of the data transformation nodes using the first data and the second data.

9. The method as recited in claim 7, wherein a first data producer node of the polytree represents an active data source, and wherein a second data producer node of the polytree represents a passive data source that is queryable for second data after first data is acquired from the active data source.

10. The method as recited in claim 5, further comprising:
    storing a modified transformation specification; and
    using the execution engine to execute the modified transformation specification.

11. The method as recited in claim 5, further comprising:
    registering a modified execution engine; and
    using the modified execution engine to execute the transformation specification.

12. The method as recited in claim 5, further comprising:
    storing a plurality of additional transformation specifications, wherein the additional transformation specifications are expressed according to the transformation specification format, and wherein one or more additional execution engines are selected from among the available execution engines for implementation of at least some of the additional transformation specifications.

13. A non-transitory computer-readable storage medium storing program instructions computer-executable to perform:
    storing a transformation specification, wherein the transformation specification is expressed according to a transformation specification format, wherein the transformation specification represents a graph linking one or more data source nodes, one or more data transformation nodes representing one or more types of transformations, and one or more data sink nodes;
    selecting an execution engine for execution of the transformation specification, wherein the execution engine is selected from among a plurality of available execution engines based at least in part on a registration of the execution engine to perform the one or more types of transformations, and wherein the set of available execution engines comprises an additional execution engine that is registered to perform one or more additional types of transformations and not the one or more types of transformations; and
    using the execution engine to acquire data from one or more data sources corresponding to the one or more data source nodes, perform one or more transformations of the data corresponding to the one or more data transformation nodes, and output one or more results of the one or more transformations to one or more data sinks corresponding to the one or more data sink nodes.

14. The non-transitory computer-readable storage medium as recited in claim 13, wherein a coordinator stores the registration of the execution engine to perform the one or more types of transformations, wherein the registration is provided to the coordinator by the execution engine, and wherein the execution engine is selected by the coordinator from among the plurality of available execution engines based at least in part on the registration.

15. The non-transitory computer-readable storage medium as recited in claim 13, wherein the graph represents a polytree, wherein the polytree comprises a first root node and a second root node representing the data source nodes, and wherein the program instructions are further computer-executable to perform:
    acquiring first data from a first data source corresponding to the first root node;
    encountering a particular one of the data transformation nodes that uses a plurality of inputs, including the first data from the first data source and second data from a second data source corresponding to the second root node;
    walking back up the polytree to the second root node;
    acquiring the second data from the second data source corresponding to the second root node; and
    performing a data transformation corresponding to the particular one of the data transformation nodes using the first data and the second data.

16. The non-transitory computer-readable storage medium as recited in claim 13, wherein the graph represents a polytree, wherein a first data source node of the polytree represents an active data source, and wherein a second data source node of the polytree represents a passive data source that is queryable for second data after first data is acquired from the active data source.

17. The non-transitory computer-readable storage medium as recited in claim 13, wherein the program instructions are further computer-executable to perform:
    storing a modified transformation specification; and
    using the execution engine to execute the modified transformation specification.

18. The non-transitory computer-readable storage medium as recited in claim 13, wherein the program instructions are further computer-executable to perform:
    registering a modified execution engine; and
    using the modified execution engine to execute the transformation specification.

19. The non-transitory computer-readable storage medium as recited in claim 13, wherein one of the transformations provides output to a plurality of the data sinks.

20. The non-transitory computer-readable storage medium as recited in claim 13, wherein at least some of the execution engines are implemented using computing resources of a multi-tenant provider network.

\* \* \* \* \*